US011469903B2

(12) United States Patent
Shankar et al.

(10) Patent No.: US 11,469,903 B2
(45) Date of Patent: Oct. 11, 2022

(54) AUTONOMOUS SIGNING MANAGEMENT OPERATIONS FOR A KEY DISTRIBUTION SERVICE

(71) Applicant: MICROSOFT TECHNOLOGY LICENSING, LLC, Redmond, WA (US)

(72) Inventors: Chetan Shankar, Bothell, WA (US); Kahren Tevosyan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 428 days.

(21) Appl. No.: 16/289,652

(22) Filed: Feb. 28, 2019

(65) Prior Publication Data
US 2020/0280449 A1    Sep. 3, 2020

(51) Int. Cl.
*H04L 9/32*    (2006.01)
*H04L 9/08*    (2006.01)

(52) U.S. Cl.
CPC .......... *H04L 9/3247* (2013.01); *H04L 9/0825* (2013.01); *H04L 9/0861* (2013.01);
(Continued)

(58) Field of Classification Search
CPC ... H04L 9/3247; H04L 9/0894; H04L 9/3242; H04L 9/0861; H04L 9/0825; H04L 9/3213
(Continued)

(56) References Cited

U.S. PATENT DOCUMENTS 7,050,589 B2 *    5/2006    Kwan .................... H04L 63/04
                                                380/278
7,159,113 B1 *    1/2007    Taniguchi ............. H04L 9/3247
                                                713/170
(Continued)

FOREIGN PATENT DOCUMENTS

CN    102394745 A    *  3/2012
KR    101385929 B1   *  4/2014
(Continued)

OTHER PUBLICATIONS

"Final Office Action Issued in U.S. Appl. No. 15/995,087", dated Oct. 15, 2020, 5 Pages.
(Continued)

*Primary Examiner* — Shahriar Zarrineh
(74) *Attorney, Agent, or Firm* — Shook, Hardy & Bacon L.L.P.

(57) ABSTRACT

Various methods and systems are provided for autonomous signing management for a key distribution service ("KDS"). In operation, a key request from a KDS client device is received at a KDS server. The key request is associated with a security token of a signing entity caller or verifying entity caller, and a signature descriptor. The signature descriptor supports signing data with an encryption key and verifying a signature with a decryption key. The signing entity caller or the verifying entity caller is authenticated based on the corresponding security token and signature descriptor. The encryption key or the decryption key associated with the key request is generated. The encryption key or the decryption key is generated based on authenticating using the security token and the signature descriptor. The encryption key or the decryption key is communicated to a KDS client device the KDS client to sign data or decrypt a signature.

20 Claims, 7 Drawing Sheets

(52) U.S. Cl.
CPC .......... *H04L 9/0894* (2013.01); *H04L 9/3213* (2013.01); *H04L 9/3242* (2013.01)

(58) Field of Classification Search
USPC ........................................................ 713/176
See application file for complete search history.

(56) References Cited

U.S. PATENT DOCUMENTS

| | | | | |
|---|---|---|---|---|
| 7,206,412 | B2* | 4/2007 | Yokota | H04L 9/0822 380/278 |
| 7,228,427 | B2* | 6/2007 | Fransdonk | G06Q 20/12 705/51 |
| 7,346,771 | B2* | 3/2008 | Narayanan | H04L 9/0825 370/216 |
| 7,404,084 | B2* | 7/2008 | Fransdonk | G06Q 20/12 380/277 |
| 7,457,416 | B1* | 11/2008 | Elliott | H04L 9/0852 380/256 |
| 7,680,744 | B2* | 3/2010 | Blinn | H04L 63/12 705/59 |
| 7,734,051 | B2* | 6/2010 | Carter | H04L 9/0891 380/278 |
| 7,761,465 | B1* | 7/2010 | Nonaka | H04L 9/083 707/770 |
| 7,904,725 | B2* | 3/2011 | Pavlicic | G06Q 20/02 713/176 |
| 8,281,136 | B2* | 10/2012 | Ramakrishna | H04L 63/0807 713/172 |
| 8,327,134 | B2* | 12/2012 | Griffin | H04L 9/3247 713/172 |
| 8,959,570 | B2* | 2/2015 | Wurth | H04L 63/102 726/1 |
| 8,973,118 | B2* | 3/2015 | Fitzpatrick, III | H04L 9/3213 726/4 |
| 9,172,698 | B1* | 10/2015 | Evans | G06F 21/31 |
| 9,252,947 | B1 | 2/2016 | Beacham et al. | |
| 9,300,660 | B1* | 3/2016 | Borowiec | H04L 63/102 |
| 9,768,962 | B2* | 9/2017 | Acar | H04L 9/3213 |
| 10,187,375 | B1* | 1/2019 | Kincaid | H04L 9/3247 |
| 10,193,700 | B2* | 1/2019 | Liu | H04W 12/069 |
| 10,341,485 | B1 | 7/2019 | Patel et al. | |
| 10,666,657 | B1* | 5/2020 | Threlkeld | H04L 63/06 |
| 2002/0152389 | A1* | 10/2002 | Horita | G06F 21/64 713/180 |
| 2002/0169971 | A1* | 11/2002 | Asano | H04L 9/3273 713/193 |
| 2003/0200458 | A1* | 10/2003 | Hori | G06F 21/10 726/20 |
| 2005/0050330 | A1* | 3/2005 | Agam | G07F 7/1025 713/172 |
| 2005/0076198 | A1* | 4/2005 | Skomra | H04L 63/0823 713/156 |
| 2005/0172132 | A1* | 8/2005 | Chen | H04L 9/0816 713/180 |
| 2007/0094503 | A1 | 4/2007 | Ramakrishna | |
| 2007/0113076 | A1* | 5/2007 | Cowburn | H04L 9/0825 713/159 |
| 2007/0154016 | A1* | 7/2007 | Nakhjiri | H04W 12/0431 380/270 |
| 2007/0186110 | A1* | 8/2007 | Takashima | H04N 21/835 713/173 |
| 2007/0209071 | A1* | 9/2007 | Weis | H04L 63/062 726/15 |
| 2007/0226785 | A1* | 9/2007 | Chow | H04L 9/3271 726/8 |
| 2007/0297610 | A1* | 12/2007 | Chen | H04W 12/033 380/270 |
| 2010/0154041 | A1* | 6/2010 | Dalzell | H04L 9/3213 726/6 |
| 2010/0223459 | A1* | 9/2010 | Carter | H04L 9/083 713/155 |
| 2011/0072157 | A1* | 3/2011 | Liu | H04L 45/02 709/242 |
| 2011/0103589 | A1* | 5/2011 | Tie | H04L 9/0825 380/282 |
| 2012/0131660 | A1* | 5/2012 | Dalzell | H04L 63/062 726/9 |
| 2012/0294445 | A1* | 11/2012 | Radutskiy | H04L 9/0863 380/278 |
| 2013/0028415 | A1* | 1/2013 | Takashima | H04L 9/0869 380/44 |
| 2013/0191632 | A1* | 7/2013 | Spector | H04L 9/0847 713/155 |
| 2014/0125125 | A1* | 5/2014 | Wyatt | G06Q 30/04 307/18 |
| 2014/0136840 | A1* | 5/2014 | Spalka | G06F 21/6245 713/165 |
| 2014/0169564 | A1* | 6/2014 | Gautama | G07C 9/00309 380/270 |
| 2015/0046985 | A1* | 2/2015 | D'Souza | H04L 9/14 726/4 |
| 2015/0154589 | A1* | 6/2015 | Li | G06F 21/44 705/67 |
| 2015/0178504 | A1 | 6/2015 | Nystrom et al. | |
| 2015/0318986 | A1* | 11/2015 | Novak | H04L 63/0823 713/189 |
| 2016/0127904 | A1* | 5/2016 | Ward | H04L 9/321 713/176 |
| 2016/0149900 | A1* | 5/2016 | Justin | G06F 21/577 713/156 |
| 2016/0156598 | A1* | 6/2016 | Alonso Cebrian | H04L 63/0428 713/168 |
| 2016/0365975 | A1* | 12/2016 | Smith | H04L 9/0833 |
| 2017/0187521 | A1 | 6/2017 | Fitch et al. | |
| 2017/0195121 | A1* | 7/2017 | Frei | H04L 9/0825 |
| 2017/0255932 | A1 | 9/2017 | Aabye et al. | |
| 2018/0183774 | A1* | 6/2018 | Campagna | H04L 9/3247 |
| 2018/0278426 | A1* | 9/2018 | Tang | H04L 9/0861 |
| 2019/0097802 | A1* | 3/2019 | Rowe | H04L 63/0884 |
| 2019/0124058 | A1* | 4/2019 | Kawahara | H04W 12/0431 |
| 2019/0372758 | A1 | 12/2019 | Tevosyan et al. | |

FOREIGN PATENT DOCUMENTS

KR 20170052162 A * 5/2017
WO WO-2017008953 A1 * 1/2017 ............. G06F 21/57

OTHER PUBLICATIONS

"Notice of Allowance Issued in U.S. Appl. No. 15/995,087", dated Dec. 9, 2020, 9 Pages.
"Non Final Office Action Issued in U.S. Appl. No. 15/995,087", dated Apr. 30, 2020, 15 Pages.

* cited by examiner

AUTONOMOUS SIGNING MANAGEMENT OPERATIONS FOR A KEY DISTRIBUTION SERVICE

BACKGROUND

Users often rely on applications and services to perform computing tasks. Distributed computing systems (e.g., cloud computing platforms) host applications and services using computing architectures that support network access to a shared pool of configurable computing and storage resources. A distributed computing system can support building, deploying, and managing applications and services. Users and enterprises are moving away from traditional computing infrastructures to run their applications and services on distributed computing systems. Distributed computing systems aim to efficiently and securely operate when utilizing distributed computing system resources.

By way of example, a datacenter key distribution service (dKDS) or (KDS) enables secure data exchange. In particular, the dKDS eliminates the need to manage encryption and decryption of keys. dKDS can specifically implement components that extend client devices in a distributed computing system. However, dKDS does not include support for an autonomous data signing mechanism, where a client sending data could prove that the client itself was the entity that generated the data. As such, dKDS can be extended to support an autonomous data signing mechanism such that a client can securely digitally sign data, while dKDS still provides secure and transparent management of signing keys. In distributed computing systems where resources such as data, applications, service, and secrets operate in a distributed manner, digitally signing data using an autonomous signing mechanism poses various challenges.

SUMMARY

Embodiments of the present invention relate to methods, systems, and computer storage media for providing autonomous signing management operations for a key distribution service (dKDS) in a distributed computing system. By way of background, a data protection application programming interface ("data protector" or "data protection component") provides encryption and decryption functionality to support protecting data at a client device. The data protector may further include additional functionality to protect data in distributed computing systems. A datacenter key distribution service (dKDS) enables secure data exchange by eliminating the need to manage encryption and decryption of keys. In particular, a data protection application programming interface (e.g., DPAPI-NG—Data Protection Application Programming Interface-Next Generation) can be extended to clients in a distributed computing system to provide secure transfer and storage of data. For example, for a first client to securely transfer data (e.g., BLOB—Binary Large Object data), the client retrieves an encryption key from dKDS and provides information on a second client that can decrypt the BLOB data. The second client receives the BLOB data and decrypts the BLOB data by fetching a decryption key from dKDS by proving its identity. However, dKDS does not include support for an autonomous data signing mechanism, where a client sending data could prove that the client itself was the entity that generated the data.

In a conventional implementation of a dKDS, the dKDS is configured to encrypt data that a specific client or clients can decrypt. When the client receives the data, the client has to authenticate itself against challenges defined by a data protector. A conventional dKDS lacks support in a signing scenario, where a data encryptor has to prove who they claim to be and the data decryptor has to verify the claim of the data encryptor. The dKDS further does not offer an autonomous signing mechanism while still providing autonomous secret management for compliance reasons and breach. As such, a comprehensive system that addresses the challenges identified above and other challenges is integral to providing autonomous signing management functionality.

Embodiments described in the present disclosure are directed towards technologies for improving data signing based on an autonomous signing management system that provides autonomous data signing in a key distribution service (dKDS). An autonomous signing management system includes components that support autonomous signing management operations. The autonomous signing management system components include sign data manager (e.g., a SignDataOAPI application programming interface) and a verify signature manager (e.g., a VerifySignature( ) API). The sign data manager and the verify signature manager operate with dKDS to provide support for digitally signing data, while securely and transparently managing signing key.

By way of background, a datacenter key distribution service (dKDS) enables secure data exchange, and in particular, dKDS provides support for a sending entity (or client) to encrypt data that a specific recipient entity (or client) can decrypt. The recipient entity has to prove itself based on a protection descriptor (including claims) that supports authenticating the recipient entity. With regard to signing data (e.g., blob data), the challenge with providing an autonomous signing mechanism is the requirement to have a sending entity (encryptor) prove itself to the recipient entity (decryptor) that verifies the sending entity as the encryptor. For example, the operations would need to ensure that the correct sending entity can get the encryption key and any other entity can verify that a signature has been signed by the correct sending entity.

Embodiments described herein extend a dKDS protection mechanism to include an autonomous signing mechanism that operates with a signature descriptor. For example, signature descriptor may be a string that defines which entity can get the encryption key. When data has to be signed, the sending entity can specify its identity in the signature descriptor and then sign the data. The signing entity uses the signature descriptor to obtain an encryption key from dKDS. In particular, dKDS verifies that the identity specified in the signature descriptor is the identity with which sending entity has authenticated, and then dKDS issues the encryption key. The sending entity uses the encryption key to sign the data. At the recipient entity, the combination of the data, the signature, and the signature descriptor is received. The recipient entity authenticates its identity using the signature descriptor, and then communicates the signature descriptor to dKDS to obtain the decryption key. The recipient entity uses the decryption key to verify the signature. As such, the autonomous singing management system includes operations with dKDS to provide support for a sending entity (or client) to encrypt data that a specific recipient entity (or client) can decrypt.

Moreover, the signing management operations are implemented with a dKDS that also provides centralized and standardized management of keys used in data protection via a data protector on a client device. In particular, keys, which are used by the data protector to perform encryption and decryption of data at the client, are autonomously managed away from the data protector. dKDS generates encryption keys and decryption keys ("keys"). For example, the client components of the key distribution service operate with a data protector at the client and key distribution server operations manage encryption and decryption scenarios and corresponding keys in a distributed computing system. The key distribution server operations may be implemented using a key distribution server component having a key operations component and a root key store. A datacenter security token service (dSTS) may also be implemented as part of the key distribution service as an identity provider.

Accordingly, the performance improvement of computing operations may be associated with extending dKDS to support an autonomous data signing mechanism such that a client can securely digitally sign data, while still off-loading key management from a data protector on a client to the key distribution server that provides key management via centralized and standardized dKDS operations for applications and services in a distributed computing system, in accordance with embodiments of the present disclosure, as described herein.

Accordingly, one exemplary embodiment of the present invention provides improved autonomous signing management using a key distribution service (KDS) in a distributed computing system. In operation, a key request from a KDS client device is received at a KDS server. The key request is associated with a security token of a signing entity caller or verifying entity caller, and a signature descriptor. The signature descriptor supports signing data with an encryption key and verifying a signature with a decryption key. The signing entity caller or the verifying entity caller is authenticated based on the corresponding security token and signature descriptor. The encryption key or the decryption key associated with the key request is generated. The encryption key or the decryption key is generated based on authenticating using the security token and the signature descriptor. The encryption key or the decryption key is communicated to a KDS client device the KDS client to sign data or decrypt a signature.

As such, the embodiments described herein improve computing operations for autonomous signing management for a dKDS in a distributed computing system. For example, autonomous signing management operations include a variety of signing, encrypting, verifying, and decrypting operations with the eliminated burden of managing keys; thus both the dKDS and the data protector operate more efficiently. In this regard, the autonomous signing management system addresses the specific problem digitally signing data using an autonomous signing mechanism and improves the existing key management processes in distributed computing systems.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
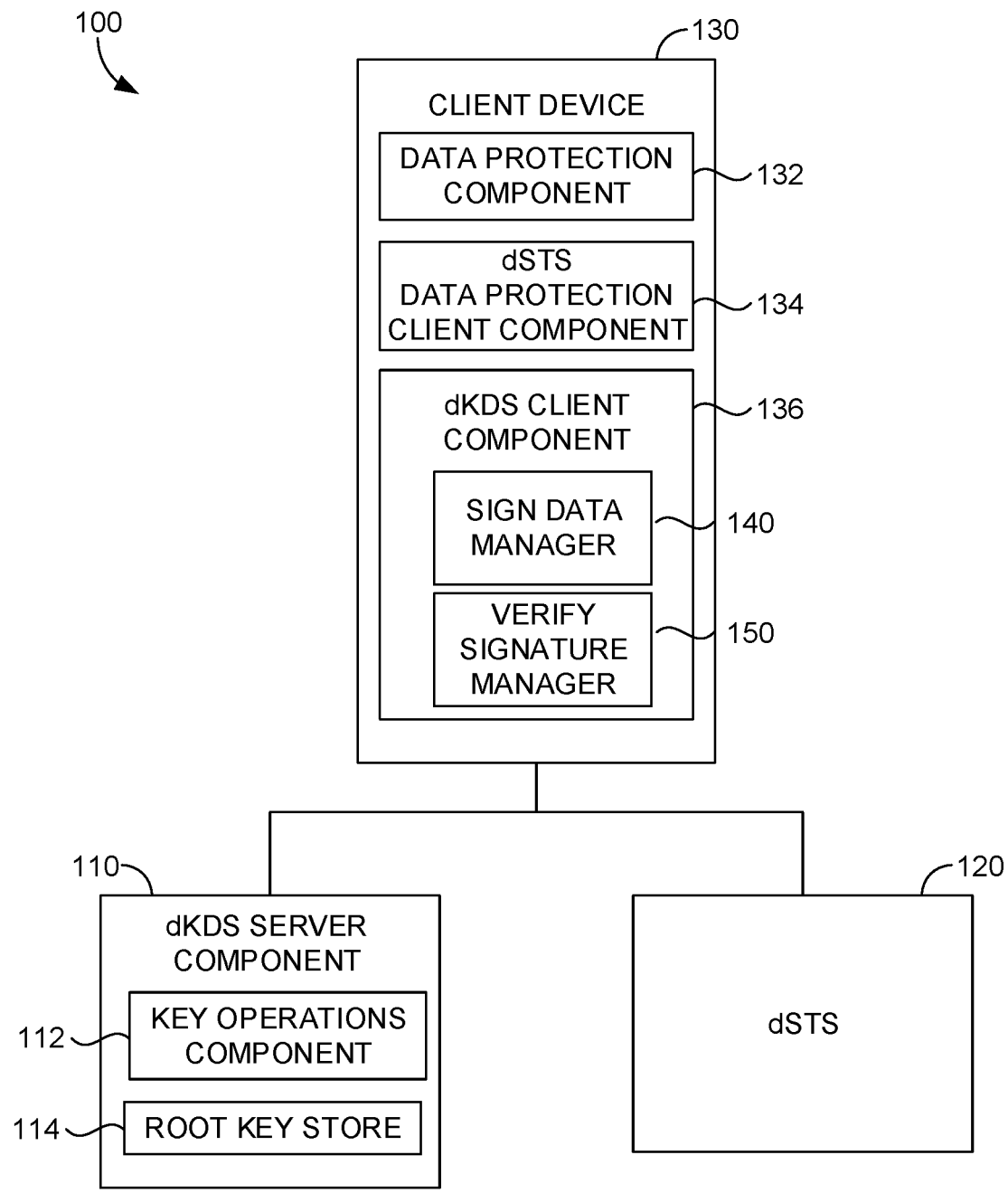
FIG. 1 is a block diagram of an autonomous signing management system for a key distribution service, in accordance with embodiments described herein.

Distributed computing systems aim to efficiently and securely operate when utilizing cloud resources. By way of background, a data protection application programming interface (DPAPI) ("data protector") is an API that supports protecting data at a client device. In particular, the data protector includes two functions, a function that performs encryption of data and a function that performs decryption of data. Typically, only a user with the same logon credentials as the user who encrypted the data can decrypt the data. The decryption function decrypts and executes an integrity check on the data. In addition, the encryption and decryption usually must be done on the same computer.

Distributed computing systems, however, often require that content encrypted on one computer be decrypted on another computer. The data protector also includes an update (i.e., DPAPI-NG or Cryptography NG DPAPI) that supports this functionality in the distributed computing system. In particular, the data protector enables secure sharing of secrets (i.e., keys, passwords, key material) and messages protecting them to a set of security mechanisms (e.g., Active Directory or web credentials) that can be used to unprotect them on different computers after proper authentication and authorization. Data protection operations (e.g., encryption and decryption) are provided using the security mechanisms and policies that are passed into a function call, a policy defines which user can decrypt the data and therefore which key should be used.

The data protector supports protection descriptors (i.e., sequential list of one or more protectors) expressed in a string based language called protection descriptor string. The data protection operation can be based on a router-provider framework where a router component calls a provider component to encrypt a content encryption key for encrypting selected data. The data protection may implement a specified syntax (e.g., cryptographic message syntax—CMS) format to store the encrypted data, the encrypted content encryption key and provider and key identifier.

By way of example, a datacenter key distribution service (dKDS) enables secure data exchange. In particular, the dKDS eliminates the need to manage encryption and decryption of keys. dKDS can specifically implement components that extend clients in a distributed computing system. However, dKDS does not include support for an autonomous data signing mechanism, where a client sending data could prove that the client itself was the entity that generated the data. In distributed computing systems, where resources such as data, applications, service, and secrets operate in a distributed manner, digitally signing data using an autonomous signing mechanism poses various challenges. As such, an alternative and comprehensive approach that would extend dKDS to support an autonomous data signing mechanism such that a client can securely digitally sign data, while dKDS still provides secure and transparent management of signing keys can improve computing operations in a distributed computing system.

Embodiments of the present invention provide simple and efficient methods and systems for implementing an autonomous signing management system for the key distribution service. In particular, the autonomous signing management system supports autonomous data signing using a descriptor model. The autonomous signing management system includes components that support autonomous signing management operations. The autonomous signing management components include sign data manager (e.g., a SignData( ) API application programming interface) and a verify signature manager (e.g., a VerifySignature( ) API). The sign data manager and the verify signature manager operate with dKDS to provide support for digitally signing data, while securely and transparently managing signing key as detailed in below and in U.S. patent application Ser. No. 15/995,087, filed May 31, 2018, entitled "AUTONOMOUS SECRETS MANAGEMENT FOR A KEY DISTRIBUTION SERVICE", which is herein incorporated by reference in its entirety.

At a high level, the autonomous signing management operations are based on a sign data manager and a verify signature manager operating in a descriptor model where signature descriptors specify who can get an encryption key. Signature descriptors are claim-based authentication objects that contain claims. In operation, the sign data manager of a signing client accesses data and a signature descriptor. The data is the data to be signed and the signature descriptor contains claims of the signing client, which is signing the data. The sign data manager computes a hash of the data to be signed. The sign data manager communicates the hash and the signature descriptor to a signing client data protection component (e.g., DPAPI—data protection application programming interface) of the signing client. The data protection component of the signing client authenticates with dSTS (datacenter secret token service) and executes a call to dKDS providing the dSTS token and the signature descriptor.

dKDS includes a key operations component that accesses the signature descriptor. The key operations component verifies that the claims passed in the signature descriptor are contained in the dSTS token received from the signing client data protection component. The key operations component generates an encryption key after executing the verification operation and communicates the encryption key to the signing client data protection component. The signing client data protection component encrypts the hash to sign the data. For example, the data generated may be an encryption-decryption tuple (e.g., <Data BLOB, signature, signature descriptor>).

With reference to the verify signature manager, a decrypting client calls the verify signature manager to access the encryption-decryption tuple. The verify signature manager generates a hash of the data. The verify signature manager then passes the signature and the signature descriptor to the decrypting client data protection component. The decrypting client data protection component authenticates its identity with dSTS using the signature descriptor and executes a call to dKDS providing the dSTS token and the signature descriptor.

dKDS includes a key operations component that accesses the signature descriptor. The key operations component verifies that the claims passed in the signature descriptor are contained in the dSTS token received from the signing client data protection component. The key operations component generates a decryption key after executing the verification operation and communicates the decryption key to the decrypting client data protection component. The decryption key corresponds to the encryption key generated to sign the data. The decrypting client data protection component uses the decryption key to decrypt the signature and verify the hash.

As such, the embodiments described herein improve the computing operations, functionality, and the technological process for providing autonomous signing management operations (e.g., sign data manager operations and verify signature manager) that extend dKDS to support an autonomous data signing mechanism such that a client can securely digitally sign data, while dKDS still provides secure and transparent management of signing keys. In particular, unconventional operations, the non-generic arrangement of components, the data structures designed to store and retrieve secrets, and the ordered combination of steps for performing autonomous signing management operations result in computing improvements and efficiency in providing autonomous signing management for distributed computing systems.

With reference to FIG. 1, FIG. 1 illustrates an exemplary distributed computing system 100 in which implementations of the present disclosure may be employed. In particular, FIG. 1 shows a high level architecture of a distributed computing system as an autonomous signing management system 100 having components in accordance with implementations of key distribution service of the present disclosure. The distributed computing system corresponds to the distributed computing system described herein with reference to FIG. 7 and FIG. 8. Among other managers, components, or engines (collectively "components") not shown, the distributed computing system 100 includes dKDS server component 110 having key operations component 112 and root key store 114, dSTS 120, and client device 130 having data protection component 132, dSTS data protection client component 134, dKDS client component 136. The data protection component 132 and the dSTS data protection client component 134 may be collectively referred to as "data protector".

Each of the identified components may represent a plurality of different instances of the component. The components may communicate at least some messages using the same messaging protocol. The components of the distributed computing system 100 may communicate with each other over one or more networks (e.g., public network or virtual private network "VPN"). The network (not shown) may include, without limitation, one or more local area networks (LANs) and/or wide area networks (WANs).

The components of the distributed computing system may operate together to provide functionality for an autonomous signing management system 100, as described herein. The autonomous signing management system 100 supports data signing, signature verifying, encryption and decryption requests from the client device 130 as a signing entity (client, sending entity, or encryptor) or as a verifying entity (client, recipient entity, or decryptor). The client device 130 operates with the data protection component 132 that executes data protector operations via a router provider infrastructure, the dSTS data protection client component 134 that executes dSTS data protection client operations as an identity provider, and the dKDS client component 136 (e.g., sign data manager 140 or verify signature manager 150) that executes dKDS client operations for encryption and decryption keys. The sign data manager 140 and the verify signature manager 150 operate with dKDS to provide support for digitally signing data. The client device 130 further operates with the dKDS server component 110 to exchange messages for encrypting and decrypting data without having to perform key management at the client device 130 in that the dKDS server component 110 executes dKDS server component operations to autonomously manage keys at the dKDS server component 110.

The dSTS 120 may be an identity provider that provides dSTS operations that support the key distribution service functionality. The key distribution service can include using the identity name (e.g., identity identifier) of an application or service, by way of the key distribution service components (e.g., dKDS client component 134 and dKDS server component 110) to retrieve a security token from dSTS 120. In this regard, autonomous signing management via the key distribution service operates with the dSTS 120 as discussed in more detail below.

The dKDS client component 136 implements two managers or APIs: sign data manager 140 (e.g., a SignData( ) API application programming interface) and a verify signature manager 150 (e.g., a VerifySignature( ) (API). It is contemplated that the client device 130 may be a representation of a signing entity and a verifying entity in accordance with embodiments described here. The sign data manager 140 and the verify signature 150 manager operate with dKDS to provide support for digitally signing data, while securely and transparently managing signing key. The autonomous signing management operations are based on a sign data manager 140 and a verify signature manager 150 operating in a descriptor model where signature descriptors specify who can get an encryption key. Signature descriptors are claim-based authentication objects that contain claims. The signature descriptor can be a string of the format "SignDescriptor: <dKDS DNS>; <claim type>; <claim>; <root key descriptor>" where dKDS DNS represents the DNS name of the dKDS that issued the signing key, the claim type represents claim identifying the signing entity; and root key descriptor is a descriptor identifying the root key that was used to generated the signing key.

The sign data manager 140 is responsible for signing data at the client device 130. The sign data manager 140 access a signature descriptor and data to be signed. The data is the data to be signed and the signature descriptor contains claims of the signing client, which is signing the data. The sign data manager 140 computes a hash of the data to be signed. The sign data manager communicates the hash and the signature descriptor to the data protector. The verify signature manager 150 is responsible for verifying signature at the client device 130. The verify signature manager 150 accesses the data, the signature and signature descriptor and generates a hash of the data. The verify signature manager then passes the signature and the signature descriptor to the decrypting client data protection component.

The data protector is responsible for executing data protector operations during data signing, signature verifying, and authentication with the sign data manager 140, the verify signature 150 and dSTS 120. For example, during data signing, the sign data manager 140 communicates the hash and the signature descriptor to the data protector. The data protector authenticates with dSTS 120 and executes a call to dKDS providing the dSTS token and the signature descriptor. And during verifying signature, the verify signature manager 150 communicates the signature and the signature descriptor to the data protector. The data protector authenticates its identity with dSTS 120 using the signature descriptor and executes a call to dKDS providing the dSTS token and the signature descriptor.

The dKDS server component 110 is responsible for dKDS server component operations that support the functionality of the key distribution service. The dKDS server component operations also include operations performed via the key operations component 112 and root key store 114. During data signing, key operations component 112 accesses the signature descriptor. The key operations component 112 verifies that the claims passed in the signature descriptor are contained in the dSTS token received from the data protector (signing entity). The key operations component 112 generates an encryption key after executing the verification operation and communicates the encryption key to the data protector.

During verifying signature, the key operations component 112 accesses the signature descriptor. The key operations component 112 verifies that the claims passed in the signature descriptor are contained in the dSTS token received from the data protector (verifying entity). The key operations component 112 generates a decryption key after executing the verification operation and communicates the decryption key to the data protector. The decryption key corresponds to the encryption key generated to sign the data. The data protector uses the decryption key to decrypt the signature and verify the hash.

Figure 2:
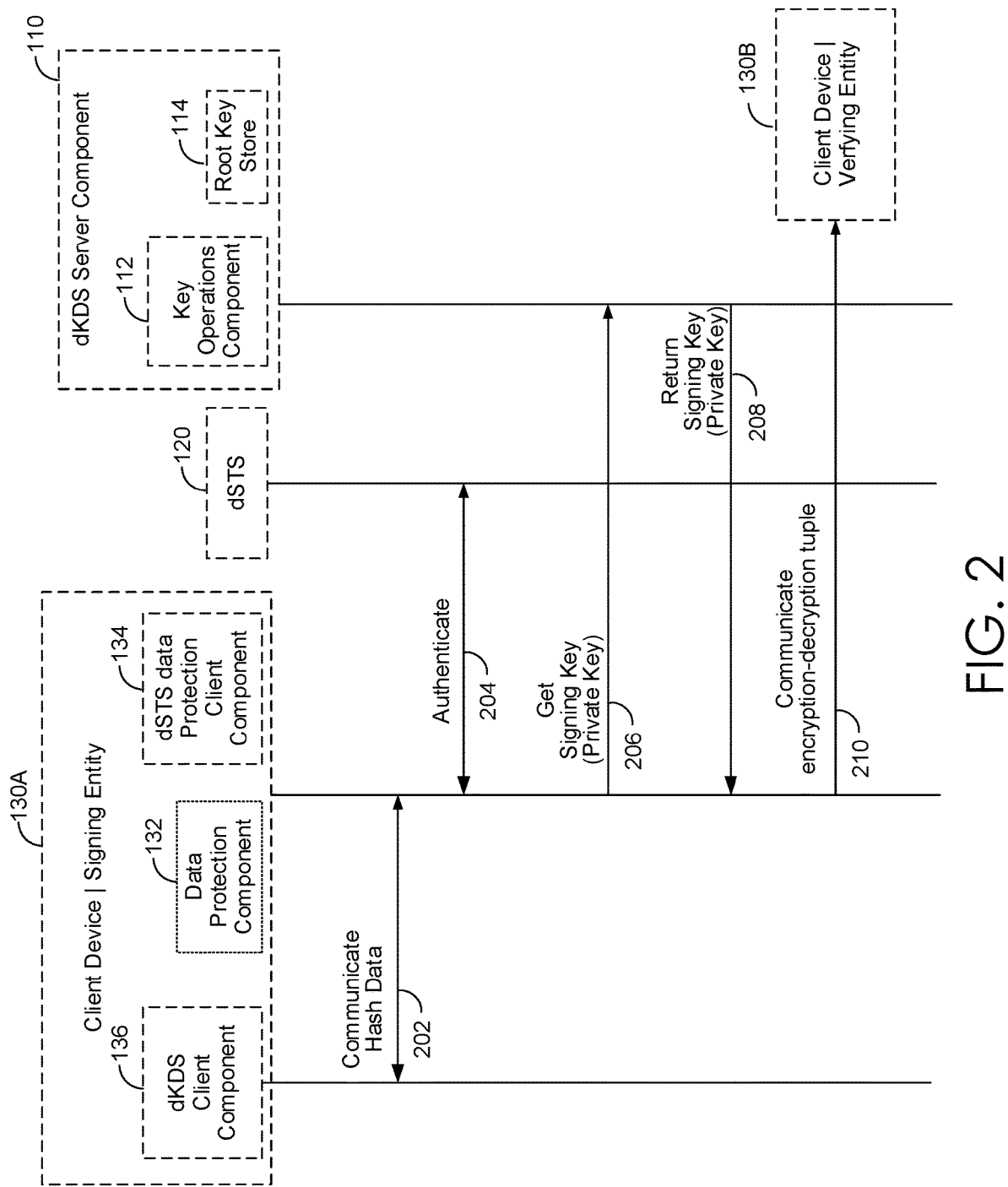
FIG. 2 is a flow diagram showing an example method for autonomous signing management in a key distribution service, in accordance with embodiments described herein.

With reference to FIG. 2, FIG. 2 illustrates an example data signing sequence diagram in accordance with embodiments of the present disclosure. FIG. 2 includes client device 130, data protection component 132, dSTS data protection client component 134, dKDS client component 136, dKDS server component 110, dSTS 120, key operations component 112 and root key store 114. In operation, at step 202 the signing entity130 creates a new instance of a signature descriptor, and invokes a function to sign data. For example, a sign data manager of dKDS client component 136 computes a hash of the data to be signed. The dKDS client component 136 communicates the hash and the signature descriptor to the data protection component 132. At step 204, the dSTS data protection client component 134 authenticates with dSTS 120 and at step 206 data protection component 132 executes a call (e.g., Get Signing Key (Private Key)) to the dKDS server component 110 providing the dSTS token and the signature descriptor.

At step 208, the key operations component 122 accesses the signature descriptor. The key operations component 112 verifies that the claims passed in the signature descriptor are contained in the dSTS token received from signing entity 130A. The key operations component 112 generates an encryption key after executing the verification operation and communicates the encryption key to the signing entity 130A. The data protection component 132 encrypts the hash to sign the data. For example, the data generated may be an encryption-decryption tuple (e.g., <Data BLOB, signature, signature descriptor>). At step 210, the signing entity 130A communicates the encryption-decryption tuple to the verifying entity 130B.

Figure 3:
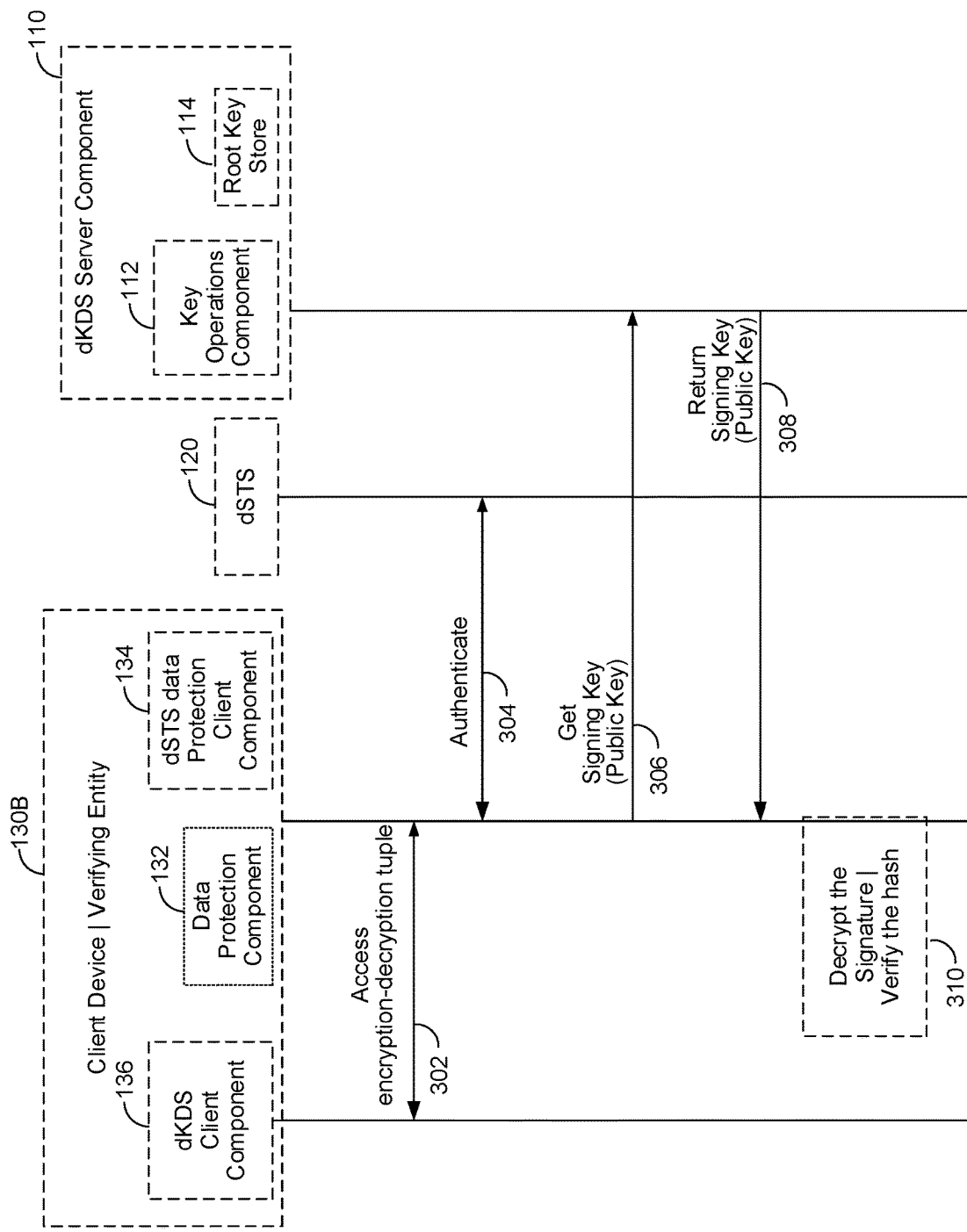
FIG. 3 is a flow diagram showing an example method for autonomous signing management in a key distribution service, in accordance with embodiments described herein.

With reference to FIG. 3, FIG. 3 illustrates an example signature verifying sequence diagram in accordance with embodiments of the present disclosure. In operation, at step 302, the verifying entity access the encryption-decryption tuple and invokes a function to verify the signature. For example, a verify signature manager of dKDS client component 136 generates a hash of the data. The dKDS client component 136 communicates the signature and the signature descriptor to the data protection component 134. At step 304, the dSTS data protection client component 134 authenticates with dSTS 120 using the signature descriptor and at step 206 data protection component 132 executes a call (e.g., Get Signing Key (Public Key)) to the dKDS server component providing the dSTS token and the signature descriptor.

At step 308, the key operations component 122 accesses the signature descriptor. The key operations component 112 verifies that the claims passed in the signature descriptor are contained in the dSTS token received from verifying entity 130A. The key operations component 112 generates a decryption key after executing the verification operation and communicates the decryption key to the verifying entity 130A. The decryption key corresponds to the encryption key generated to sign the data. At step 310, the data protection component 132 uses the decryption key to decrypt the signature and verify the hash.

Accordingly, the performance improvement of computing operations may be associated with extending dKDS to support an autonomous data signing mechanism such that a client can securely digitally sign data, while still off-loading key management from a data protector on a client to the key distribution server that provides key management via centralized and standardized dKDS operations for applications and services in a distributed computing system, in accordance with embodiments of the present disclosure, as described herein.

Example Flow Diagrams

Figure 4:
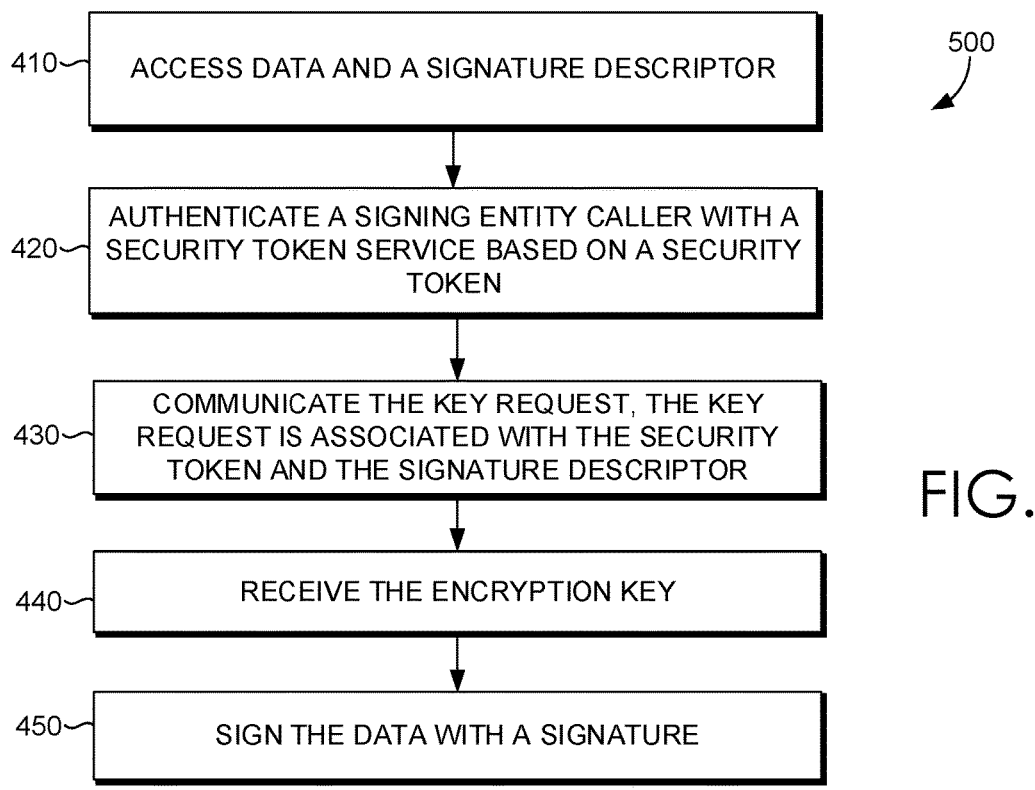
FIG. 4 is a flow diagram showing an example method for autonomous signing management in a key distribution service, in accordance with embodiments described herein.
Figure 5:
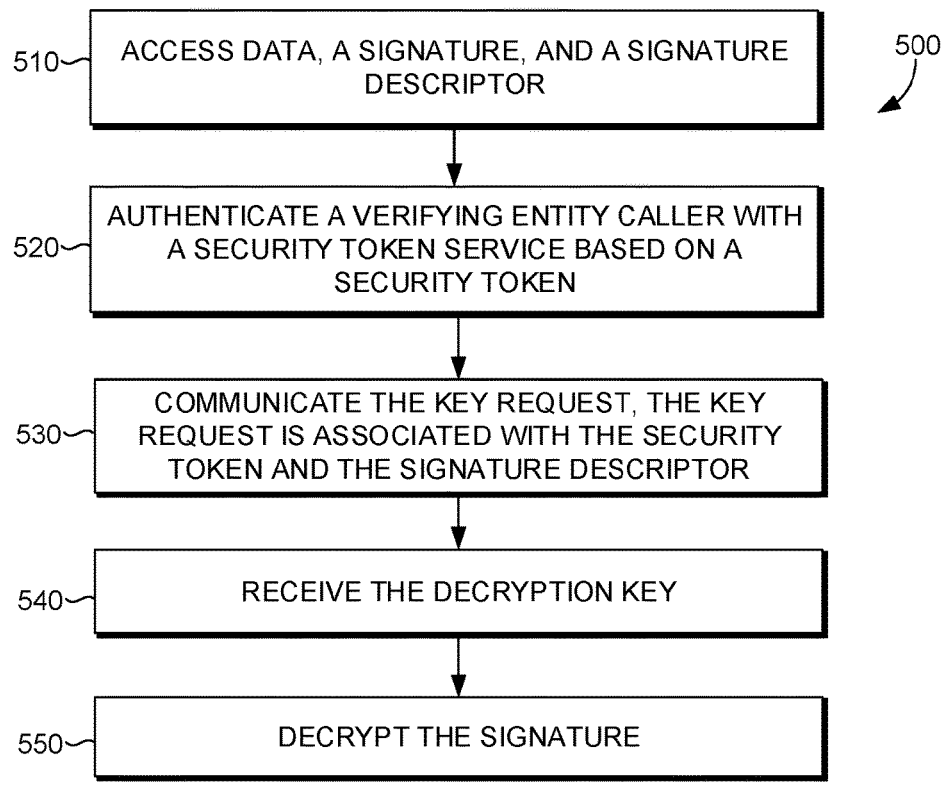
FIG. 5 is a flow diagram showing an example method for autonomous signing management in a key distribution service, in accordance with embodiments described herein.
Figure 6:
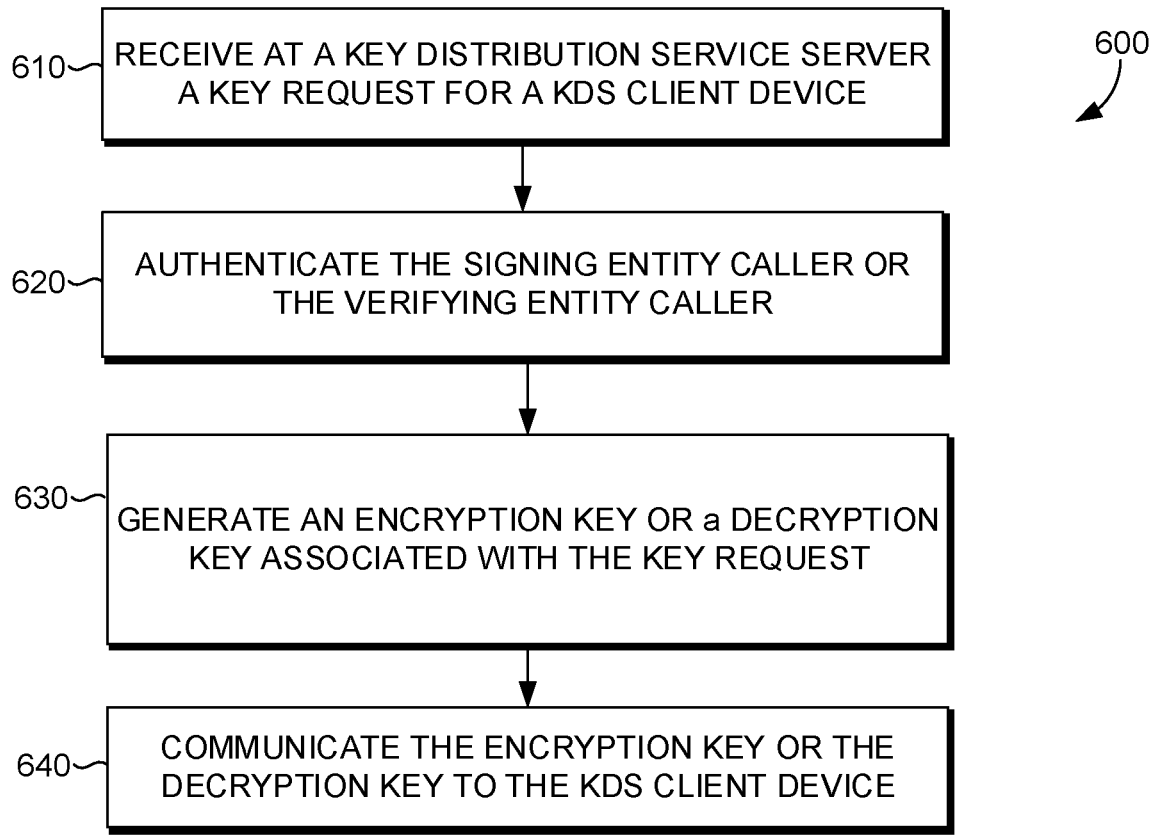
FIG. 6 is a flow diagram showing an example method for autonomous signing management in a key distribution service, in accordance with embodiments described herein.

With reference to FIGS. 4, 5, and 6, flow diagrams are provided illustrating methods for providing autonomous signing management for a key distribution service in a distributed computing environment. The methods can be performed using the autonomous signing management system described herein. In embodiments, one or more computer storage media having computer-executable instructions embodied thereon can, when executed by one or more processors, cause the one or more processors to perform the methods in the autonomous signing management system.

Turning to FIG. 4, a flow diagram is provided that illustrates a method 700 for implementing an autonomous signing management system. Initially at block 410, data and a signature descriptor are accessed. The signature descriptor supports signing data with the encryption key and verifying a signature with the decryption key, the signature used to sign the data. At block 420, a signing entity caller is authenticated with a security token service (STS) based on a security token. At block 430, a key request is communicated. The key request is associated the security token of the signing entity caller and the signature descriptor. At block 440, the encryption key is received. At block 450, the data is signed with a signature.

Turning to FIG. 5, a flow diagram is provided that illustrates a method 500 for implementing an autonomous signing management system. Initially at block 510 data, a signature, and a signature descriptor is accessed. A signature descriptor supports signing data with the encryption key and verifying a signature with the decryption key. At block 520, a verifying entity caller is authenticated with a security token service (STS) based on a security token. At block 530, a key request is communicated. The key request is associated the security token of the verifying entity caller and the signature descriptor. At block 540, the decryption key is received. At block 550, the signature is decrypted.

Turning to FIG. 6, a flow diagram is provided that illustrates a method 600 for implementing an autonomous signing management system. Initially at block 610, a key request is received. The key request is associated with a security token of a signing entity caller or a verifying entity caller, and a signature descriptor. The signature descriptor supports signing data with an encryption key and verifying a signature with a decryption key. At block 620, the signing entity caller or the verifying entity caller is authenticated based on the security token and the signature descriptor. At block 630, the encryption key or the decryption key associated with the key request is generated. The encryption key or the decryption key is generated based on authenticating using the security token and the signature descriptor. At block 640, the encryption key or the decryption key is communicated to the KDS client device.

Example Datacenter Key Distribution Service

By way of background, a datacenter key distribution service (dKDS) enables secure data exchange. In particular, the dKDS eliminates the need to manage encryption and decryption of keys. dKDS can specifically implement components that extend clients in a distributed computing system. The key distribution service provides centralized and standardized management of keys used in data protection via a data protector on a client device. In particular, keys, which are used by the data protector to perform encryption and decryption of data at the client, are autonomously managed away from the data protector. The key distribution service provides protector encryption keys and protector decryption keys ("keys"). The key distribution service is implemented to ensure that a client that no longer satisfies a set of claims loses access to new data protected using the keys after a predefined time interval. Therefore, the keys for each set of claims may also change periodically; however, old keys cannot be deleted since a legitimate client may want to unprotect data that was protected with an old protector key.

The key distribution service may be implemented using both client-side and server-side components. For example, the client components (e.g., data protector—a data protection component and a dSTS data protection client component, and dKDS client component) implement key distribution service client operations for encryption and decryption scenarios and corresponding keys in a distributed computing system. The key distribution service server operations may be implemented using a key distribution server component having a key operations component and a root key store. A security token service may also be implemented as part of the key distribution service as an identity provider.

In addition, the key distribution service may operate using a key derivation scheme that provides several benefits over conventional key storage. For example, an amount of storage overhead for the key distribution service may be limited based on a key derivation scheme of the key distribution service. However, more importantly, the key derivation scheme supports deriving keys from a small set of master keys. The cryptographic properties of the key derivation scheme ensures that a protector key issued to a given set of claims cannot provide information about the protector keys issued for a different set of claims. The key derivation scheme also ensures that future protector keys for a given set of claims cannot be deduced from past and present protector keys. In this regard, the key distribution service support key creation and key derivation using key protection rules and access rights verification, with support for protection descriptor strings, as discussed herein in more detail.

Advantageously, the performance improvement of computing operations may be associated with off-loading key management from a data protector on a client to the key distribution server that provides key management via centralized and standardized key distribution service operations for applications and services in a distributed computing system. In particular, the improvement to computing operations associated with key distribution components in a distributed computing system results in computing efficiency. For example, key operations are performed at a key distribution service server component and the data protector performs encryption and decryption operations with the eliminated burden of managing keys; thus both the key distribution service and the data protector operate more efficiently.

The key distribution service may be implemented using both client-side and server-side components. For example, the client components (e.g., data protector—a data protection component and a dSTS data protection client component, and dKDS client component) implement key distribution service client operations for encryption and decryption scenarios and corresponding keys in a distributed computing system. The key distribution service server operations may be implemented using a key distribution server component having a key operations component and a root key store. A security token service may also be implemented as part of the key distribution service as an identity provider.

In addition, the key distribution service may operate using a key derivation scheme that provides several benefits over conventional key storage. For example, an amount of storage overhead for the key distribution service may be limited based on a key derivation scheme of the key distribution service. However, more importantly, the key derivation scheme supports deriving keys from a small set of master keys. The cryptographic properties of the key derivation scheme ensures that a protector key issued to a given set of claims cannot provide information about the protector keys issued for a different set of claims. The key derivation scheme also ensures that future protector keys for a given set of claims cannot be deduced from past and present protector keys. In this regard, the key distribution service support key creation and key derivation using key protection rules and access rights verification, with support for protection descriptor strings, as discussed herein in more detail.

Advantageously, the performance improvement of computing operations may be associated with off-loading key management from a data protector on a client to the key distribution server that provides key management via centralized and standardized key distribution service operations for applications and services in a distributed computing system. In particular, the improvement to computing operations associated with key distribution components in a distributed computing system results in computing efficiency. For example, key operations are performed at a key distribution service server component and the data protector performs encryption and decryption operations with the eliminated burden of managing keys; thus both the key distribution service and the data protector operate more efficiently.

Various terms and acronyms are used throughout this description. Although more details regarding various terms are provided throughout this description, general definitions of some terms are included below to provide examples and a clearer understanding of the ideas disclosed herein:

AES refers to an Advanced Encryption Standard.
CEK refers to Content Encryption Key.
CMS refers to Cryptographic Message Syntax which is a format for encoding encrypted messages.
CNG refers Cryptography Next Generation.
DH refers to Diffie-Hellman-Merkle cryptographic key exchange protocol.
dKDS refers to Key Distribution Service.
dSTS refers to Datacenter Security Token Service.
DPAPI refers to Data Protection Application Programming Interface.
KDF refers to Key Derivation Function which is a cryptographic primitive for deriving cryptographic keys from given seed material.
KEK refers to Key Encryption Key. KEK protects the CEK. A protected (wrapped) CEK may be written as {CEK}KEK.
PKCS refers to Public Key Cryptography Standard which is a group of security standards.
Protected blob refers to the result of protecting a secret with the dKDS. The protected blob cryptographically protects the secret from disclosure to unauthorized parties and ensures that unauthorized modifications or tampering can be detected by an authorized user.
Protection descriptor refers to a string describing a caller's intent about how a secret should be protected. The protection description may be passed as input to the data protection API, and can be recovered from a protected data blob.
Protector key refers to a cryptographic key that corresponds to a particular protector. The protector key may have the property that only the security principal represented by the protector is capable of unwrapping data that is cryptographically wrapped with the protector key. The protector key may be a symmetric key or a public key.
Protector decryption key refers to cryptographic key required to unwrap data that is wrapped with a given protector key. If the protector key is a symmetric key, then the protector decryption key is also the same key. If the protector key is a public key, then the protector decryption key is the corresponding private key. Note that possession of a protector decryption key does not necessarily enable a user to decrypt a protected blob (e.g. if the protector is part of an AND clause).
SD refers to a Security Descriptor which is a construct for expressing the authorization policy of an object (such as a file).
SDDL refers to Security Descriptor Description Language. A notation for describing SDs may be human-readable form.

With reference to FIG. 1, the data protection component 132 and the dSTS data protection component (collectively "data protector") are responsible for data encryption functionality such as encrypt the data. The data protector may also support the functionality of traditional DPAPI and DPAPI-NG. The data protector is a policy based data protection API. The policy may be passed into the function call defines which user can decrypt the data and therefore which key should be used. The policy is expressed in a string based language called protection descriptor string. String based policy language data is protected using a protector string. The following is an example syntax of protector string.

Provider name:=UNICODE string
Provider value:=UNICODE string
Protector phase:=provider name=provider value
Protector phase:="provider name"="provider value"
Protector phase:=<Protector phase>AND<Protector phase>
Protection descriptor string:=<Protector phase>OR<Protector phase>

In the above definition, provider name is the name of the provider which can interpreter the protector phase. Provider value is the information that the specific provider can use to identify the key. The canonical form in the expression and that AND expression may be evaluated first. For example, using the following protector string, the data can be decrypted by either a user in the specific group or a password for user abby saved in his credential locker.

SID=<Group SID> or WebCredentials=login.live.com, abby

The data protector is implemented is a router provider infrastructure. The router calls the provider dSTS data protection component to encrypt or decrypt the content encryption key for encrypting the data. The router finds the provider image name based on the provider name from the registry. The router loads the provider d11 and calls the corresponding interface implemented by the provider d11. The data protectors uses CMS format to store the encrypted data, encrypted content encryption key and provider-key identifier. The data protector may be used as the client API. The dKDS client component is plugged in through the dSTS data protection component.

The dKDS client component 136 implements two methods: "GetEncryptionKey" and "GetDecryptionKey". The "GetEncryptionKey" that retrieves the client token from dSTS 120 and creates a message in the format expected by dKDS server component 110 and makes a call to the dKDS server component 110. The method returns the encryption key blob as generated by the key generation component or an error HRESULT if an error occurs during this process. The "GetDecryptionKey" method retrieves the client token from dSTS 120 and creates the message in the format expected by dKDS and makes a call to the dKDS server component 110. The method returns the decryption key blob as generated by the key generation component (if authorized) or an error HRESULT otherwise or if an error occurs during this process. In order to optimize network traffic and server load, decryption keys may be cached locally. Encryption keys are not cached. Even when an encryption key was requested seconds ago and the L2_ID has not changed, there is a chance that the root key has been automatically rolled, so the local cache would be invalidated without the client being aware of it.

The dKDS server component 110 is responsible for dKDS server component operations that support the functionality of the key distribution service. The dKDS server component operations also include operations performed via the key operations component 112 and root key store 114. At a high level, the dKDS server component 110 may authorize key releases and generate key based on claims. The dKDS server component 110 may provide key authorization in that it may perform checks to see if a key can be generated for the client based on the client's token information and the claim the client needs to satisfy. The dKDS server component 110 also stores the root key using the root key store 114. The root key is an important secret because if the root key leaks, the key distribution service may be compromised or otherwise inoperable. In some embodiments, the dKDS server component 110 may support root key renewal such that it retains and stores multiple keys after a renewal occurs. The dKDS server component 110 may return the newest root key (when there are multiple root keys) for encryption and a key identifier (i.e., key ID). The dKDS may retrieve a root key based on its key ID if such key exists.

The dKDS server component 110 includes the key operations component 114 that is responsible for operations to perform encryption and decryption. The key operations component may generate an encryption key based on the claims. A client needs to satisfy the claims at the time of the encryption and the root key store returns the key. The encryption key may be associated with a key ID, which contains the time the key is generated, the root key ID for root key retrieval and the claim information. The key operations component may also provide the decryption key, where the decryption key may be generated by the key generation method based on the information in the key ID. The result may be returned as an opaque key blob.

The dKDS server component 110 includes the key operations component 112 that is responsible for operations to create a rook key and add a root key. A create root key function is invoked when the first key is created or during a key rolling operation. The output key needs to be stored somewhere accessible to dKDS server component 110 because the generated root keys need to be loaded when the service starts. An add root key function makes an existing root key available for key generation, for example, using the key operations component. Requests for L2 keys, as discussed below, referencing this root key can be handled after this call completes successfully.

The dKDS server component 110 supports a key derivation scheme that obviates having to track keys and keys may simple be derived using other known information. The key derivation scheme requires the following configuration parameters:

1. Key interval: This is the interval after which a new key will be issued. For example, the key interval may be fixed to a predefined time period, to coincide with a Kerberos ticket lifetime.

2. Key lifetime: This is the time for which each individual key is valid. A key that is past its lifetime may not be used to protect data. The key lifetime is generally much longer than the key interval, since a client may miss a few key intervals due to transient issues such as loss of network connectivity. The key lifetime may be fixed to the length of an L1 interval.

3. L1 iterations ($L_{1max}$): For example, fixed to 32 cycles, as discussed below.

4. L2 iterations ($L_{2max}$): For example, fixed to 32 cycles, as discussed below.

5. KDF algorithm: For example, defaults to SP 800-108 CTR HMAC KDF, as discussed.

6. KDF parameters: These parameters are always passed to any KDF calls. In addition to these, all KDFs used with this API must support a KDF CONTEXT parameter, which is passed as described later. Defaults to KDF_LABEL="SD key service".

7. Diffie-Hellman (DH) group parameters: For example, defaults to IPsec DH group 24. The Diffie-Hellman algorithm is used to compute a shared secret to be used as the base for the KEK on the client.

In operation, the key derivation scheme may divide a time (e.g., coordinated universal time—UTC time) into "L0 periods" where L0 period length=key interval*$L1_{max}$*$L2_{max}$. Thus, the current L0 period number can be computed by dividing the current UTC time by the L0 period length, and taking the integer part of the result. Each L0 period is divided into L1 periods of length (key interval*$L2_{max}$), and each L1 period is divided into L2 periods of length (key interval). L1 and L2 periods are numbered in chronological order, starting from 0. Thus, given a time and the above configuration parameters, the L0, L1 and L2 period numbers for that time are uniquely determined.

By way of example, the following properties of the key result from this way of dividing time into intervals:

1. An L2 key is valid for a SID key cycle duration currently set to 10 hours (DEFAULTKDSKEY-CYCLE=360000000000, given in 100 ns intervals to follow the file time format)
2. An L1 key is valid for 32 L2 intervals (32 cycles*10 hours=320 hours or approximately 13 days)
3. An L0 key is valid for 32 L1 intervals (32 cycles*320 hours=10,240 hours or approximately 426 days)

Example Distributed Computing Environment

Figure 7:
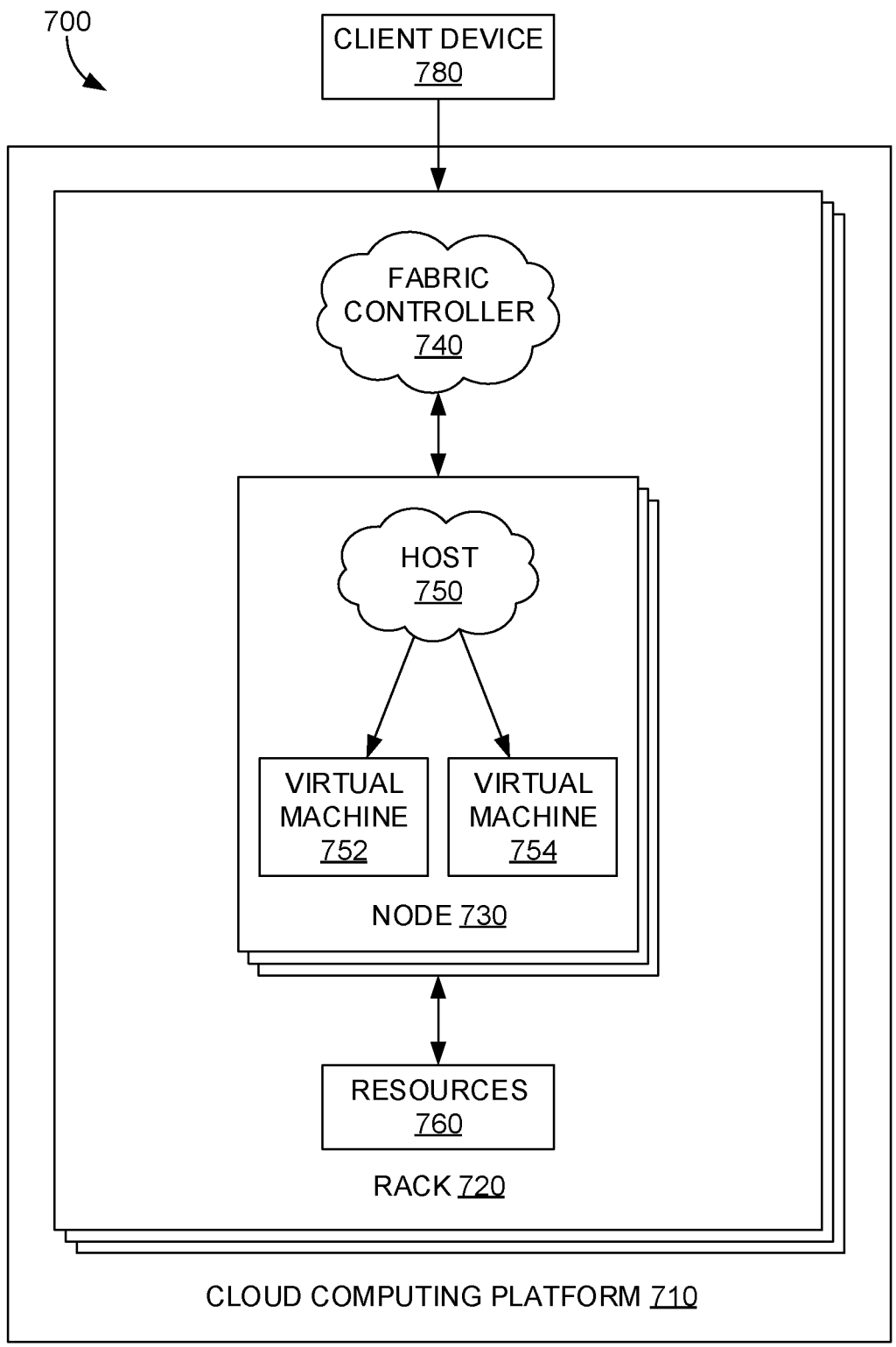
FIG. 7 is a block diagram of an example distributed computing environment suitable for use in implementing embodiments described herein.

Referring now to FIG. 7, FIG. 7 illustrates an example distributed computing environment 700 in which implementations of the present disclosure may be employed. In particular, FIG. 7 shows a high level architecture of the autonomous signing management system ("system") in cloud computing platform 710, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 700 that includes cloud computing platform 710, rack 720, and node 730 (e.g., computing devices, processing units, or blades) in rack 720. The system can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example. Client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
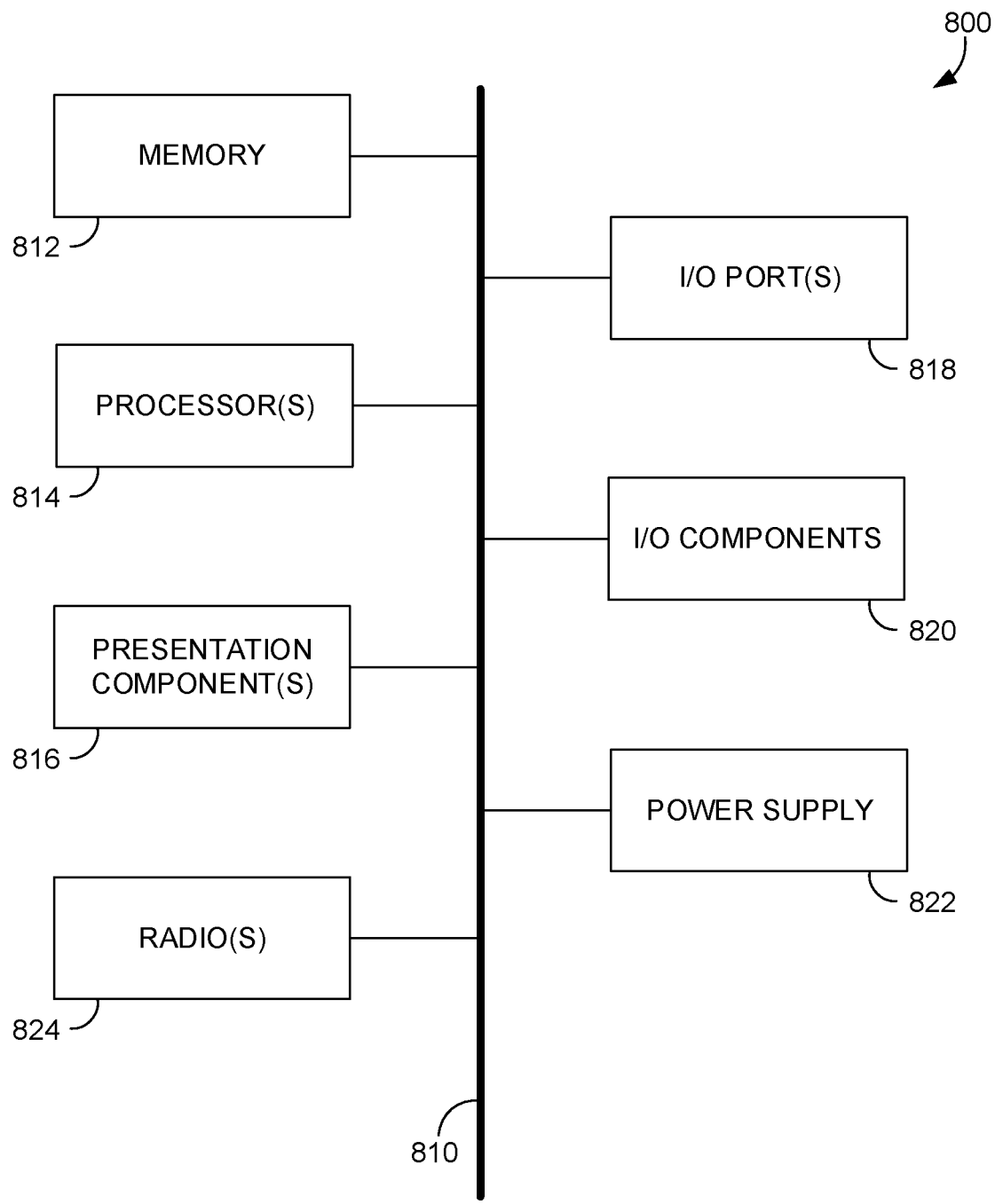
FIG. 8 is a block diagram of an example computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the autonomous signing management system, embodiments described herein support autonomous signing management. The autonomous signing management system components refer to integrated components for autonomous renewal and distribution of secrets. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the autonomous signing management system can include an API library that includes specifications for routines, data structures, object classes, and variables may support the interaction between the hardware architecture of the device and the software framework of the autonomous signing management system. These APIs include configuration specifications for the autonomous signing management system such that the different components therein can communicate with each other in the autonomous signing management system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the autonomous signing management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system for providing autonomous signing management for a key distribution service in a distributed computing system, the system comprising:
one or more processors; and
one or more computer storage media storing computer-useable instructions that, when used by the one or more processors, cause the one or more processors to execute:
a Key Distribution Service (KDS) client device configured to:
access data and a signature descriptor, wherein a signature descriptor supports autonomously signing data with an encryption key and verifying a signature with a decryption key, the signature used to sign the data,
wherein the signature descriptor is a claim-based authentication object that supports autonomously signing data at datacenter KDS (dKDS) client device components of KDS client devices via a KDS server that manages encryption keys and decryption keys in the distributed computing system and communicates the encryption keys and decryption keys based on the signature descriptor;
authenticate a signing entity caller with a security token service (STS) based on a security token and an STS data protection client component that authenticates the signing entity caller and causes claims of the signature descriptor to be embedded in the security token; and
communicate a key request, wherein the key request is associated the security token of the signing entity caller and the signature descriptor;
the Key Distribution Service (KDS) server configured to:
receive the key request from the KDS client device;
authenticate the signing entity caller based on the security token and the signature descriptor;
generate an encryption key associated with the key request; and
communicate the encryption key to the KDS client device; and
the KDS client device configured to:
receive the encryption key; and
sign the data with a signature.

2. The system of claim 1, wherein accessing the data and the signature descriptor further comprises accessing a hash of the data.

3. The system of claim 1, wherein the signature descriptor is in a string format, the claim-based authentication object comprising a KDS domain name server, a claim type, and a root key descriptor.

4. The system of claim 1, wherein embedding the claims comprises the claims being contained in a dSTS security token.

5. The system of claim 1, wherein generating the encryption key is based on verifying that claims of the signature descriptor are embedded in the security token.

6. The system of claim 1, wherein signing the data further comprises generating an encryption-decryption tuple comprising the data, the signature, and the signature descriptor.

7. The system of claim 1, wherein the KDS server performs centralized management and distribution of keys for client devices in the distributed computing system, which obviates key management and distribution using data protectors at the client devices, while providing sign data managers and verify signature managers for autonomous signing operations.

8. A computer system for providing autonomous signing management for a key distribution service in a distributed computing system, the system comprising:
one or more processors; and
one or more computer storage media storing computer-useable instructions that, when used by the one or more processors, cause the one or more processors to execute:
a Key Distribution Service (KDS) client device configured to:
access data, a signature, and a signature descriptor, wherein a signature descriptor supports autonomously signing data with an encryption key and verifying a signature with a decryption key, the signature used to sign the data,
wherein the signature descriptor is a claim-based authentication object that supports autonomously signing data at datacenter KDS (dKDS) client device components of the KDS client devices via a KDS server that manages encryption keys and decryption keys in the distributed computing system and communicates the encryption keys and decryption keys based on the signature descriptor;
authenticate a verifying entity caller with a security token service (STS) based on a security token and an STS data protection client component that authenticates the verifying entity caller and causes claims of the signature descriptor to be embedded in the security token; and
communicate a key request, wherein the key request is associated the security token of the verifying entity caller and the signature descriptor;
the Key Distribution Service (KDS) server configured to:
receive the key request from the KDS client device;
authenticate the verifying entity caller based on the security token and the signature descriptor;
generate a decryption key associated with the key request; and
communicate the decryption key to KDS client device;
the KDS client device configured to:
receive the decryption key; and
decrypt the signature.

9. The system of claim 8, wherein accessing the data further comprises hashing the data.

10. The system of claim 8, wherein the signature descriptor is in a string format, the claim-based authentication object comprising a KDS domain name server, a claim type, and a root key descriptor.

11. The system of claim 8, wherein the data, signature, and the signature descriptor are defined as an encryption-decryption tuple comprising the data, a signature, and the signature descriptor.

12. The system of claim 8, wherein embedding the claims comprises the claims being contained in a dSTS security token.

13. The system of claim 8, wherein decrypting the signature further comprises comparing a signing entity hash of the data to a decrypting entity hash of the data.

14. The system of claim 8, wherein the KDS server performs centralized management and distribution of keys for client devices in the distributed computing system, which obviates key management and distribution using data protectors at the client devices, while providing sign data managers and verify signature managers for autonomous signing operations.

15. A computer-implemented method for providing autonomous signing management for a key distribution service in a distributed computing system, the method comprising:
receiving, at a Key Distribution Service (KDS) server, a key request from a KDS client device, wherein the key request is associated with a security token of a signing entity caller or a verifying entity caller, and a signature descriptor, wherein the signature descriptor supports autonomously signing data with an encryption key and verifying a signature with a decryption key, the signature used to sign the data,
wherein the signature descriptor is a claim-based authentication object that supports autonomously signing data at datacenter KDS (dKDS) client device components of KDS client devices via the KDS server that manages encryption keys and decryption keys in the distributed computing system and communicates the encryption keys and decryption keys based on the signature descriptor;
authenticate the signing entity caller or the verifying entity caller based on the security token and the signature descriptor and an STS data protection client component that authenticates the signing entity caller or the verifying entity caller and causes claims of the signature descriptor to be embedded in the security token;
generate the encryption key or the decryption key associated with the key request, wherein the encryption key or the decryption key is generated based on the authentication of the signing entity caller or the verifying entity caller using the security token and the signature descriptor; and
communicate the encryption key or the decryption key to the KDS client device.

16. The method of claim 15, wherein the key request is an encryption key for signing the data or the key request is for a decryption key for verifying the signature.

17. The method of claim 15, wherein generating the encryption key or the decryption key is based on verifying that claims of the signature descriptor are embedded in the security token.

18. The method of claim 15, wherein the encryption key is communicated to the KDS client device to cause the KDS client to sign data based in part on generating an encryption-decryption tuple comprising the data, a signature, and the signature descriptor.

19. The method of claim 15, wherein the decryption key is communicated to the KDS client device to cause the KDS client to decrypt a signature and verify a hash of data signed using the signature.

20. The method of claim 15, wherein the KDS server performs centralized management and distribution of keys for client devices in a distributed computing system, which obviates key management and distribution using data protectors at the client devices, while providing sign data managers and verify signature managers for autonomous signing operations.

* * * * *